No. 686,211. Patented Nov. 5, 1901.
A. O. DOWSON.
PUNKA OR FAN FOR VENTILATING PURPOSES.
(Application filed June 17, 1901.)
(No Model.)
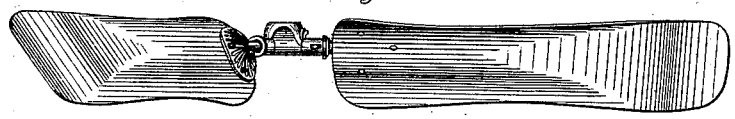
Fig. 1.
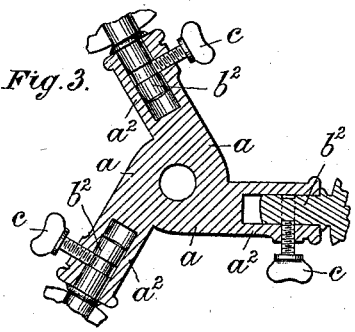
Fig. 3.
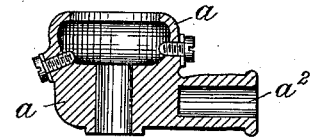
Fig. 4.
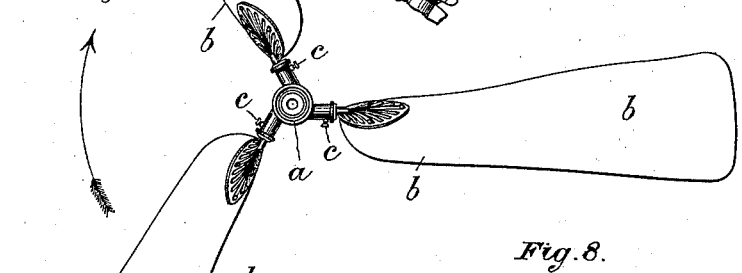
Fig. 2.
Fig. 7.
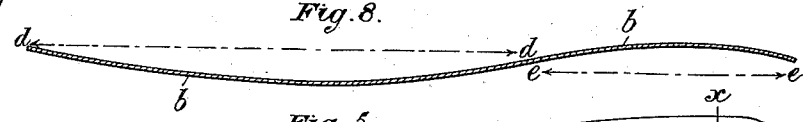
Fig. 8.
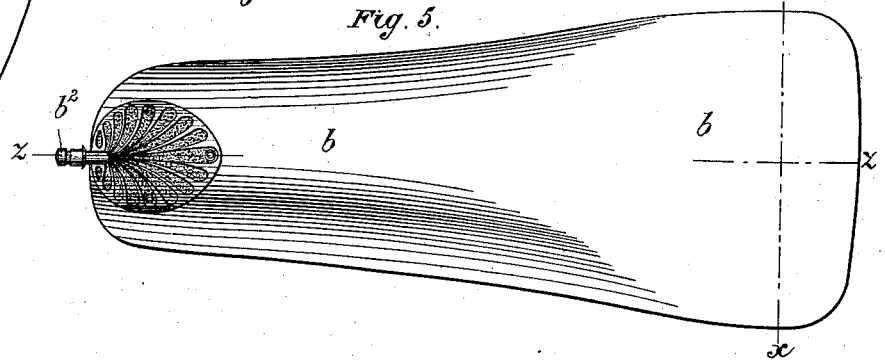
Fig. 5.
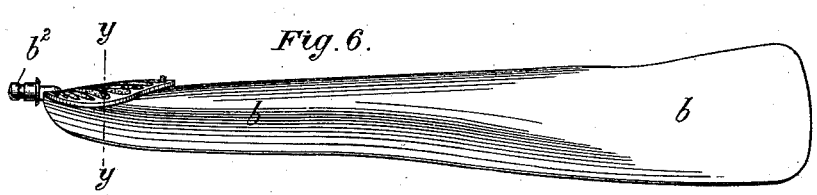
Fig. 6.
Witnesses:—
Richard Skerrett
William James Bowker
Fig. 9.
Inventor:—
Aubrey Oster Dowson

UNITED STATES PATENT OFFICE.

AUBREY OSLER DOWSON, OF BIRMINGHAM, ENGLAND.

PUNKA OR FAN FOR VENTILATING PURPOSES.

SPECIFICATION forming part of Letters Patent No. 686,211, dated November 5, 1901.

Application filed June 17, 1901. Serial No. 64,894. (No model.)

*To all whom it may concern:*

Be it known that I, AUBREY OSLER DOWSON, a subject of the King of Great Britain, residing at No. 230 Broad street, Birmingham, England, have invented certain new and useful Improvements in Punkas or Fans for Ventilating Purposes, of which the following is a specification.

My invention consists of the improvements hereinafter described in punkas or fans for ventilating purposes, the said improvements having for their object to effect motion or disturbance of the air over a greater area than is effected by punkas or ventilating-fans of the ordinary construction.

The improvements constituting the first part of my invention relate to the method of mounting the blades of the ventilating-fan or punka. According to this part of my invention I employ a body or bush having preferably three sockets projecting therefrom, the said bush being secured to the hand-power or motor driven fan-spindle. The axes of the three sockets of the body or bush are arranged tangentially or practically tangentially to the motor or hand-power-driven fan-spindle instead of radial thereto, as usual. The blades are provided at their inner ends with stems or projections, which take in the sockets described, each of the said stems being secured in place by a set-screw in one side of the socket taking into a neck or slight contraction in the stem. By the tangential setting or mounting of the blades described the draft of air produced by the working of the fan spreads over a larger area than where the blades are arranged in the ordinary way—that is, radial to the axis of the fan-spindle. By the setting or mounting of the blades in the ordinary way the said blades only beat down the air directly under them—that is to say, they do not distribute the moving air beyond the area covered by the blades.

The improvements constituting the second part of my invention relate to the construction of the fan-blades themselves. According to this part of my invention the blades on their acting face both in the direction of their width and length are made concave at their inner or stem ends and convex at their outer ends, the concave figure at the inner ends of the said blades passing gradually into the convex figure at the outer ends. Each blade is set or mounted so that the edge of its outer end makes an angle of about thirty degrees with the horizontal, and the curved part at the inner end makes an angle of about fifty-five degrees with the horizontal.

By constructing the blades in the way described their action first sets up an outward current of air in the direction of the length of the blade, which in consequence of the rotary motion of the blades is propelled or swept away with considerable force from the convex ends of the blades, and thus the action of the punka is felt at a greater distance from the axis of the fan than where the fan is provided with the ordinary or flat blades.

Figure 1 of the accompanying drawings represents in elevation and Fig. 2 in plan the blades and axial bush of a punka or ventilating-fan constructed according to my invention. Fig. 3 is a sectional plan of the axial body or bush in the tangential sockets of which the blades of the punka or fan are fixed. Fig. 4 represents the body or bush in vertical section, and Figs. 5 and 6 are a plan and elevation, respectively, of one of the fan-blades detached. Fig. 7 is a cross-section on the dotted line $x$ $x$, Fig. 5; and Fig. 8 is a longitudinal section on the dotted line $z$ $z$, Fig. 5. Fig. 9 is a cross-section on the dotted line $y$ $y$, Fig. 6. Figs. 3 to 9, both inclusive, are drawn to a larger scale than Figs. 1 and 2.

The same letters of reference indicate the same parts in the several figures of the drawings.

$a$ is the axial body or bush, which is secured to the motor or hand-power driven spindle, (not shown in the drawings,) and $a^2$ $a^2$ $a^2$ are the tangential sockets into which the stems $b^2$ of the fan-blades $b$ are inserted. The stems $b^2$ are secured in the tangential sockets $a^2$ preferably by set-screws $c$, the inner ends of which engage in annular necks in the stems $b^2$ of the fan-blades $b$. By this arrangement the fan-blades can be set at any desired angle with the horizontal.

The fan-blades $b$ are on their acting faces at the inner or stem ends concave both in the direction of their length and their width and convex in the said directions at their outer ends. The concavity of the acting face of the fan-blade in the direction of the length is shown at the part from $d$ to $d$, Fig. 8, and the convexity of the outer part in the direction of the length is shown from $e$ to $e$ in the said Fig. 8. The convexity of the outer end in the direction of the width of the blade is shown by Fig. 7, and the concavity of the inner end is shown by Fig. 9.

I prefer to set the blades $b\ b\ b$ in the sockets $a^2\ a^2\ a^2$, so that the edges of the outer ends make an angle of about thirty degrees with the horizontal.

Although I have only shown the tangential mounting of fan-blades constructed according to my invention, yet I wish it to be understood that the said fan-blades may be used with axial bushes having radial sockets.

Punka or fan blades constructed and mounted according to my invention when rotating in the direction of the arrow in Fig. 2 cause the air driven by them to travel along the inner part of the blades toward the outer ends, the convex shape of which sweeps or distributes the said current of air with considerable force both in an outward and downward direction. A disturbance of the air over a very wide area in the room or place being ventilated is thus insured.

What I claim as my invention, and desire to secure by Letters Patent, is—

1. A fan-blade concave longitudinally and transversely for a portion of its length upon one face, said face being convex longitudinally and laterally beyond said concaved portion.

2. The combination with a socketed axial body or bush, capable of being secured to the rotating spindle of the punka or fan, of blades which on their acting face are concave at their inner or stem ends both in the direction of their length and width and convex in both the said directions at their outer ends substantially as set forth and shown.

In testimony whereof I have hereunto set my hand in presence of two subscribing witnesses.

AUBREY OSLER DOWSON.

Witnesses:
 RICHARD SKERRETT,
 WILLIAM JAMES BOWKER.